United States Patent
Hars (10) Patent No.: US 10,797,722 B2
(45) Date of Patent: Oct. 6, 2020

(54) SYSTEM AND METHOD FOR PROVIDING HARDWARE BASED FAST AND SECURE EXPANSION AND COMPRESSION FUNCTIONS

(71) Applicant: The Boeing Company, Chicago, IL (US)

(72) Inventor: Laszlo Hars, Lafayette, CO (US)

(73) Assignee: The Boeing Company, Chicago, IL (US)

(*) Notice: Subject to any disclaimer, the term of this patent is extended or adjusted under 35 U.S.C. 154(b) by 51 days.

(21) Appl. No.: 15/178,973

(22) Filed: Jun. 10, 2016

(65) Prior Publication Data

US 2017/0359083 A1    Dec. 14, 2017

(51) Int. Cl.
*H03M 7/30* (2006.01)
*H04L 9/06* (2006.01)
(Continued)

(52) U.S. Cl.
CPC ............ *H03M 7/30* (2013.01); *H04L 9/065* (2013.01); *H04L 9/0838* (2013.01); *H04L 9/0869* (2013.01); *H04L 9/12* (2013.01)

(58) Field of Classification Search
CPC ........ H03M 7/30; H04L 9/065; H04L 9/0838; H04L 9/0861; H04L 9/0869; H04L 9/12
See application file for complete search history.

(56) References Cited

U.S. PATENT DOCUMENTS 5,614,841 A * 3/1997 Marbot .............. H03K 5/00006
    326/17
5,805,932 A * 9/1998 Kawashima ............ H03M 7/48
    360/48

(Continued)

FOREIGN PATENT DOCUMENTS

| EP | 2153575 A2 | 2/2010 |
| EP | 2200215 A1 | 6/2010 |
| EP | 3154217 A1 | 4/2017 |

OTHER PUBLICATIONS

Schneier et al. (On the Twofish Key Schedule, SAC'98, LNCS 1556, pp. 27-42, 1999) (Year: 1999).*
(Continued)

*Primary Examiner* — Oleg Korsak
(74) *Attorney, Agent, or Firm* — MH2 Technology Law Group LLP (57) ABSTRACT

A system and method for encoding data by providing data expansion and compression functions for arbitrary input and output lengths. The input is partitioned into groups of sequential bits. A subkey is selected from secret key material for each group of the input bits. A tree of XOR gates applies XOR operations between the subkeys to generate the output. The XOR gates are arranged in layers and all the XOR gates within a layer switch at about the same time. A compression function is performed if the input length is greater than or equal to the output length and an expansion function is performed if the input length is less than or equal to the output length. There is no statistical correlation between the input and the output. A nonlinear function can be applied to the output such as an invertible S-Box, non-invertible S-Box, or series of Rotate-Add-XOR operations.

20 Claims, 4 Drawing Sheets

(51) Int. Cl.
  *H04L 9/12* (2006.01)
  *H04L 9/08* (2006.01)

(56) References Cited

U.S. PATENT DOCUMENTS

| | | | |
|---|---|---|---|
| 8,839,001 | B2 | 9/2014 | King et al. |
| 8,843,767 | B2 | 9/2014 | King et al. |
| 2010/0150350 | A1 | 6/2010 | Reidenbach |
| 2013/0148802 | A1 | 6/2013 | Taylor et al. |
| 2014/0010364 | A1 | 1/2014 | Shibutani et al. |
| 2016/0065368 | A1 | 3/2016 | Hars |
| 2016/0112188 | A1 | 4/2016 | Choi et al. |

OTHER PUBLICATIONS

Van der Leest et al. (Hardware Intrinsic Security from D flip-flops, STC'10, Oct. 4, 2010, 10 pages) (Year: 2010).*

Mangard et al. (Pinpointing the Side-Channel Leakage of Masked AES Hardware Implementations, CHES 2006, LNCS 4249, pp. 76-90, 2006) (Year: 2006).*

Laszlo Hars "Hardware Bit-Mixers ", (Jan. 2016, 7 pages) (Year: 2016).*

U.S. Appl. No. 14/473,006, filed Aug. 29, 2014 to Hars.

Hars et al.,"Pseudorandom Recursions: Small and Fast Pseudorandom Number Generators for Embedded Applications," EURASIP Journal on Embedded Systems, vol. 2007, Article ID 98417, 2007, 13 pages.

Hars et al., "Pseudorandom recursions II," EURASIP Journal on Embedded Systems 2012, 2012:1, 11 pages.

Communication pursuant to Article 94(3) EPC dated Jan. 24, 2020 in corresponding European Application No. 17 168 210.7, 6 pages.

Search Report and Written Opinion dated Feb. 10, 2020 in corresponding Singaporean Application No. 10201704647U, 9 pages.

* cited by examiner

SYSTEM AND METHOD FOR PROVIDING HARDWARE BASED FAST AND SECURE EXPANSION AND COMPRESSION FUNCTIONS

TECHNOLOGICAL FIELD

The present disclosure relates generally to data encryption and authentication and, in particular, to an improved system and method for generating arbitrary data expansion and compression functions.

BACKGROUND

The aviation industry largely depends on the reliable functioning of critical information technology (IT) infrastructure. Like many other industries, the aviation industry is challenged with providing adequate security for such IT infrastructure and mitigating the effects of any cyber events. Examples of cyber events include malicious or suspicious events that compromise, or attempt to compromise, the operation of an aircraft's network, including its data connections, data transmission, and computing systems.

In the field of cryptography, there are many known applications of data expansion and compression functions having fixed, but different, input and output lengths, such as when an input is thoroughly mixed and then increased or reduced to a fixed output size. Examples of known applications of data expansion functions are key generators for memory encryption, key rolling in secure communications, and imbalanced Feistel ciphers on a path of long data. Examples of known applications of data compression functions are building blocks of secure hash functions, randomness amplification of entropy sources and whitening, and imbalanced Feistel ciphers on a path of short data.

Some of the desired properties for data expansion and compression functions are that: (1) every input bit affects every output bit; (2) simple changes to the input cause about half of the output bits to flip (on average); and (3) such simple changes generate no obvious correlation between the corresponding output values in accordance with standard statistical randomness tests. Examples of a simple change could be flipping a few bits simultaneously (such as less than about 25%) or applying a transformation to the data with a computer program less than about ten instructions long.

Known expansion and compression functions can depend on a large amount of secret key material, which makes their behavior unpredictable to an observer who has no access to the secret key material. These types of information security applications typically require significant operation time and consume a significant amount of power. Such security applications also typically lack stringent cryptographic requirements, particularly when one or both the input and the output of the expansion/compression function remains hidden from an observer. A significant threat remains, however, which is that an attacker can still collect information leaked on side channels about the computation work of the functions. Particularly, during operation of electronic devices that are processing data, some information about secret keys or sensitive data can leak in side channels (physical sources of unintended information dissemination), including information about variation of response times, fluctuation of power use that is dependent on the input data and secret keys, and/or ultrasonic or electromagnetic wave radiation. This could lead to discovery of the secret key material or make the function predictable to a certain degree, which creates significant risks in IT security applications.

In addition to side channel leakage, known expansion and compression functions, such as ciphers and cryptographic hash functions, are inflexible with unchangeable (fixed) input and output buffer sizes, are very slow, and consume a lot of power/energy. Also, such prior art systems provide fixed security levels even though some applications in commercial and military aviation may need differing security levels or better performance than existing solutions.

Thus, it is desirable to have an improved system and method for arbitrarily expanding and compressing data that is fast, secure, and reduces side channel leakage without significantly increasing processing time, system complexity, the size of electronic circuits, or power usage when implemented in an electronic device.

BRIEF SUMMARY

In view of the foregoing background, example implementations of the present disclosure provide a system and method for encoding data. The method includes the steps of receiving an input having a first length of input data bits, partitioning the input data bits into groups of input data bits (each group including at least one bit), selecting subkeys from key material for the groups of input data bits such that one subkey is selected for each group of input data bits, and applying at least one XOR operation between the subkeys to generate an output having a second length of output data bits. The system includes an input having a first length of input data bits, groups of input data bits that are partitioned from the input data bits (each of the groups including at least one bit), subkeys that are selected from key material for each of the groups of input data bits such that one subkey corresponds with each group of input data bits, and an output having a second length of output data bits that is generated by application of at least one XOR operation between the subkeys.

Different subkeys may share some of the bits of the key material. The secret key material is stored in a storage device, such as an electronic, magnetic or optical storage device, such as electronic flip-flops, electronic fuses, flash memory, dynamic random-access memory (DRAM), or static random-access memory (SRAM). The at least one XOR operation may be implemented by a tree of XOR gates. The XOR gates are symmetrically arranged in layers such that the XOR gates in each layer are at the same distance from the input with respect to the number of XOR gates leading to them. The XOR gates within a layer switch at about the same time.

There is no statistical correlation between the first length data and the second length data. A data expansion function is performed if the first length is less than or equal to the second length. A data compression function is performed if the first length is greater than or equal to the second length. In a further implementation of the present disclosure, a nonlinear function is applied to the output, such as an invertible S-Box, non-invertible S-Box, or a series of Rotate-Add-XOR operations.

The features, functions and advantages discussed herein may be achieved independently in various example implementations or may be combined in yet other example implementations, further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure will be primarily described in conjunction with aviation applications. It should be understood, however, that example implementations may be utilized in conjunction with a variety of other applications, both in the aviation industry and outside of the aviation industry.

According to example implementations of the present disclosure, an improved system and method provides data expansion and compression functions having arbitrary input and output sizes.

Figure 1:
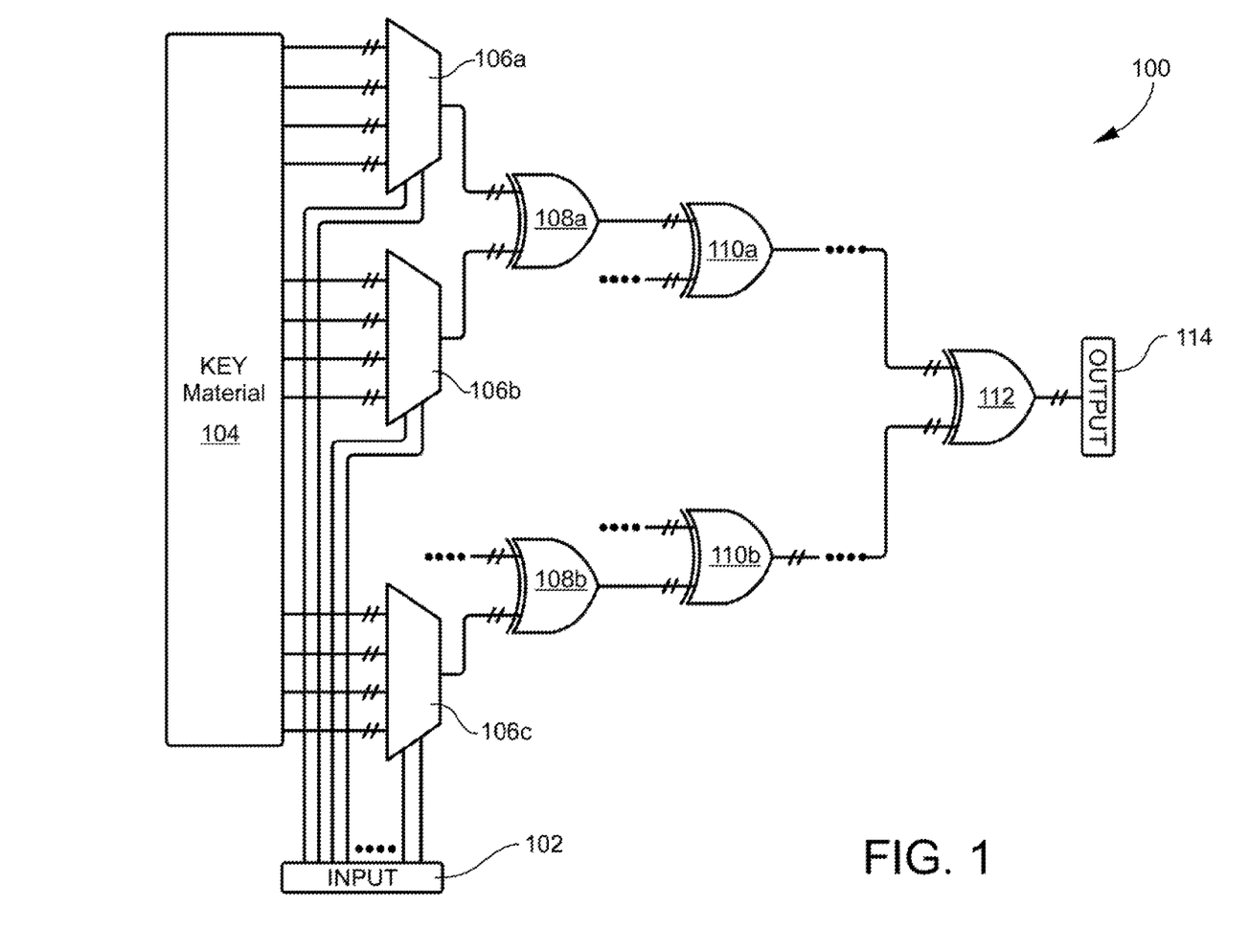
FIG. 1 is a logic diagram for expansion and compression functions of arbitrary input and output size in accordance with an example implementation of the present disclosure.
Figure 2:
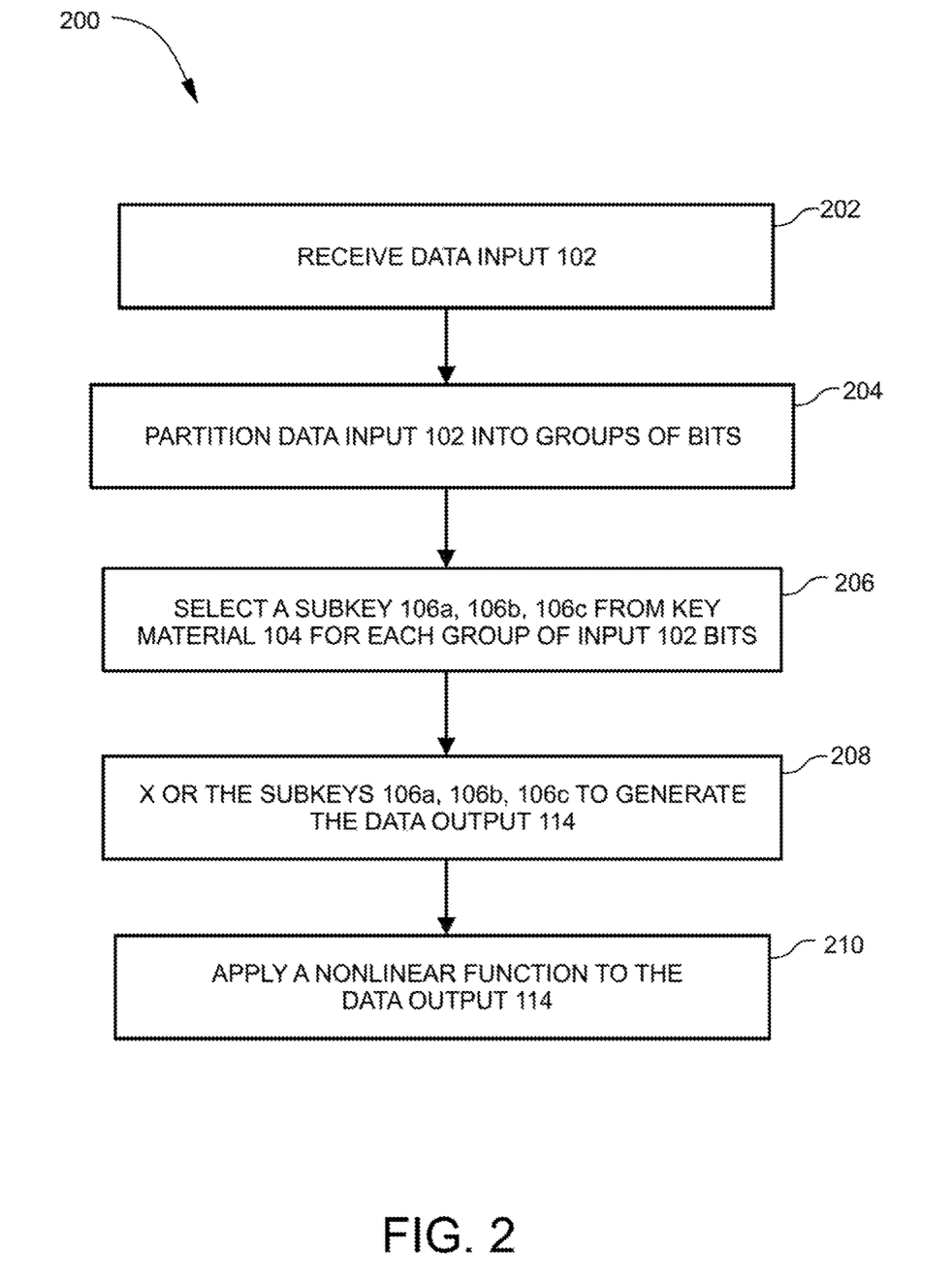
FIG. 2 is a block diagram for a method of expanding and compressing functions of arbitrary input and output size in accordance with an example implementation of the present disclosure.

As shown in FIGS. 1 (100) and 2 (200), a data input 102 is received (block 202) and is partitioned into consecutive groups of bits (block 204). For example, the input data bits of data input 102 may be partitioned into sequential groups of input data bits. In the example shown in FIG. 1, the input 102 is partitioned into groups of two bits each; however, the groups of bits can be of varying sizes so long as there is at least one bit in each group.

A subkey 106a, 106b, 106c is selected from secret key material 104 by a multiplexer for each of the groups of bits (block 206). The key material 104 can be stored in various types of electronic, magnetic or optical storage devices such as electronic flip-flops, electronic fuses, flash memory, dynamic random-access memory (DRAM), or static random-access memory (SRAM). When the key material 104 is stored in electronic flip-flops, physical security of the data is enhanced because the synthesis tool of the electronic design process disperses the flip-flops among regular gates such that there are no large memory blocks holding the secret key material 104. This is desirable because large memory blocks can be identified by microscopic inspection and subject to attack by probing, such as with focused ion beams.

The subkeys 106a, 106b, 106c taken from the key material 104 can share some bits, as long the same bit does not appear in the same bit position of different subkeys 106a, 106b, 106c (because the XOR operation on the subkeys 106a, 106b, 106c would cancel such bit). One example of shared bits is when a subkey is a bitwise rotated version of another subkey. Other complex mapping functions of the key material 104 to the subkeys is possible. This can be particularly useful when the size of the storage for the key material 104 is limited.

Referring again to the FIGS. 1 and 2, the subkeys 106a, 106b, 106c are bitwise XORed (with XOR gates 108a, 108b, 110a, 110b, 112) to generate the output 114 (block 208). Fast implementation of the XOR operations can be achieved by a tree of two-input XOR gates 108a, 108b, 110a, 110b, 112; however, multi-input XOR gates can also be used in alternative implementation. The size of the input 102 and the size of the output 114 are independent of one another. Thus, if the size of the input 102 is less than the size of the output 114, it is an expansion function. On the other hand, if the size of the input 102 is greater than the size of the output 114, it is a compression function.

The data expansion and compression functions as just described with respect to FIGS. 1 and 2 are easily implemented in electronic hardware, where the functions are secure, fast, and consume very little power and energy, and provide very low side channel leakage. The data expansion and compression functions of the present disclosure also satisfy the desired properties referenced above in that: (1) if the key material 104 contains random data, every change to an input 102 bit causes the output 114 to be changed by a random subkey 106a, 106b, 106c so every output 114 bit is influenced; (2) simple changes to the input 102, such as flipping the bits, cause the output 114 to change by an aggregate of the corresponding subkeys 106a, 106b, 106c; and (3) such simple changes generate no obvious correlation between input 102 values and the corresponding output 114 values in accordance with standard statistical randomness tests.

The data expansion and compression functions of the present disclosure additionally reduce side channel leakage based their implementation in electronic hardware with simple XOR gates 108a, 108b, 110a, 110b, 112. Accordingly, no flip-flops or data registers are needed to store the changing data, which are typically a main source of side channel leakage. As shown in FIG. 1, the gate structure for the data expansion and compression functions is highly symmetric, and the XOR gates 108a, 108b, 110a, 110b, 112 are arranged in layers, such that the XOR gates in each layer are the same distance from the input 102 in terms of the number of XOR gates in the path leading to them. For example, in the implementation shown in FIG. 1, XOR gates 108a, 108b are aligned in Level 1, XOR gates 110a, 100b are aligned in Level 2, and XOR gate 112 is in Level 3. The gates 108a, 108b, 110a, 110b, 112 within each specific layer (Layer 1, Layer 2, Layer 3) switch at about the same time. Because there are thousands of concurrent switching events, transients of individual switching events are effectively masked. Also, the XOR gates 108a, 108b, 110a, 110b, 112 have their switching transients in the range of a few picoseconds (ps) so recording and analyzing them would require data acquisition systems with sampling rates in the THz range, which is orders of magnitude faster than presently available technology. Accordingly, the data expansion and compression functions in accordance with the present disclosure are more secure and less apt to attack.

The system for providing the data expansion and compression functions as shown in FIG. 1 is a linear construction (in a binary Galois field) because it only uses bit selection and XOR operations. As a result, some complex four-way correlations could exist among certain output 114 values corresponding to simply correlated input 102 values. In most applications this is not a concern because the output 114 values remain hidden from an attacker. However, in applications where enhanced security is desired, the data expansion and compression functions of the present disclosure can be further processed by a nonlinear function (block 210). Such nonlinear function can be, for example, a parallel collection of invertible substitution boxes (S-Boxes), a result of a collection of S-Boxes (which could be invertible S-Boxes) XORed to the output 114, or a series of Rotate-Add-XOR (RAX) operations.

There are several advantages to use of system and method for arbitrarily expanding and compressing data as described above. Such expansion and compression functions are orders of magnitude faster than prior art cryptographic methods, they consume much less power when they are implemented in electronic hardware, and they are more secure than prior art methods because they leak much less information about the data they are processing on side channels. Thus, deployed systems can use slower electronic components, thereby reducing costs and power consumption of the computing system, yet while improving speed (operation time). Such improved systems can be used for scientific and engineering computations, as well as for security subsystems of aircraft computers, military and space programs, corporate networks, personal and laptop computers, smart mobile devices, and secure communication networks.

According to example implementations of the present disclosure, the various components of the improved system and method for expanding and compressing data of the present disclosure may be implemented by various means including hardware, alone or under direction of one or more computer program code instructions, program instructions or executable computer-readable program code instructions from a computer-readable storage medium.

In one example, one or more apparatuses may be provided that are configured to function as or otherwise implement the system and method for arbitrarily expanding and compressing data shown and described herein. In examples involving more than one apparatus, the respective apparatuses may be connected to or otherwise in communication with one another in a number of different manners, such as directly or indirectly via a wireline or wireless network or the like.

Generally, an apparatus of exemplary implementation for the system and method of the present disclosure may include one or more of a number of components such as a processor (e.g., processor unit) connected to a memory (e.g., storage device), as described above. The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the system and method for arbitrarily expanding and compressing data as described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Figure 3:
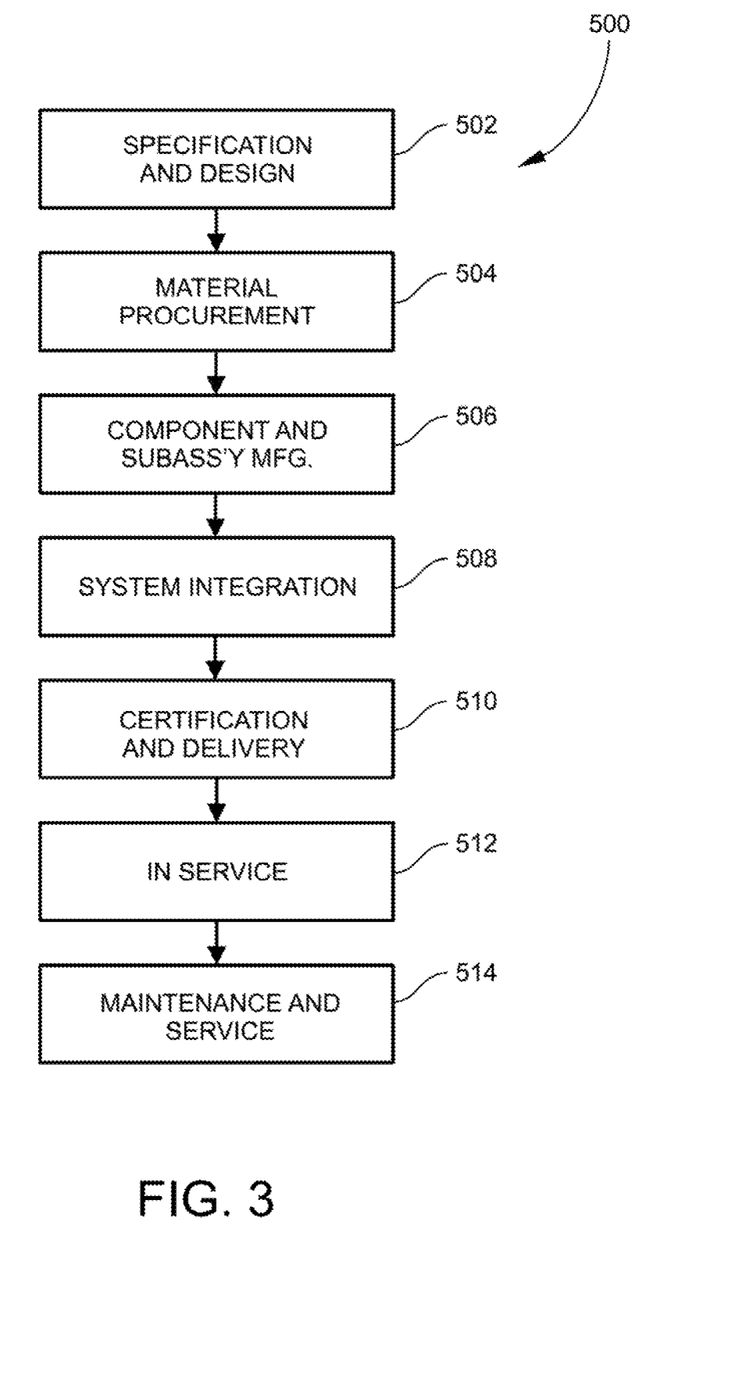
FIG. 3 is a block diagram of aircraft production and service methodology.
Figure 4:
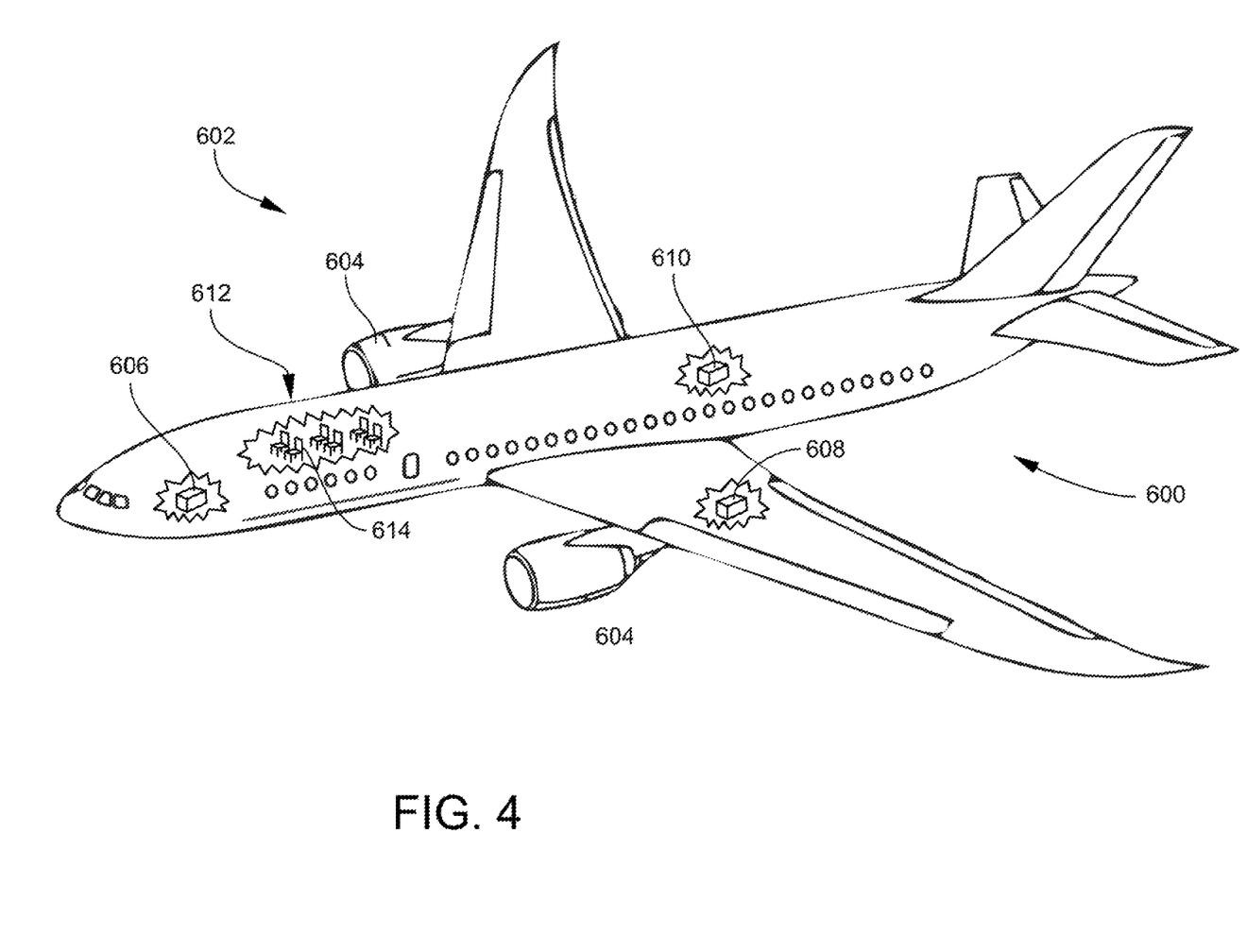
FIG. 4 is a schematic illustration of an aircraft.

As referenced above, examples of the present disclosure may be described in the context of aircraft manufacturing and service. As shown in FIGS. 3 and 4, during pre-production, illustrative method 500 may include specification and design (block 502) of aircraft 602 and material procurement (block 504). During production, component and subassembly manufacturing (block 506) and system integration (block 508) of aircraft 602 may take place. Thereafter, aircraft 602 may go through certification and delivery (block 510) to be placed in service (block 512). While in service, aircraft 602 may be scheduled for routine maintenance and service (block 514). Routine maintenance and service may include modification, reconfiguration, refurbishment, etc. of one or more systems of aircraft 602.

Each of the processes of illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 4, aircraft 602 produced by illustrative method 500 may include airframe 612 with a plurality of high-level systems 600 and interior 614. Examples of high-level systems 600 include one or more of propulsion system 604, electrical system 606, hydraulic system 608, and environmental system 610. Any number of other systems may be included. Although an aerospace example is shown, the principles disclosed herein may be applied to other industries, such as the automotive industry. Accordingly, in addition to aircraft 602, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 500. For example, components or subassemblies corresponding to component and subassembly manufacturing 506 may be fabricated or manufactured in a manner similar to components or subassemblies produced while aircraft 602 is in service. Also, one or more examples of the apparatus(es), method(s), or combination thereof may be utilized during production stages 506 and 508, for example, by substantially expediting assembly of or reducing the cost of aircraft 602. Similarly, one or more examples of the apparatus or method realizations, or a combination thereof, may be utilized, for example and without limitation, while aircraft 602 is in service, e.g., maintenance and service stage (block 514).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for encoding data with low side channel leakage comprising the steps of:
receiving an input having a first length of input data bits;
partitioning the input data bits into groups of input data bits, each group comprising at least one bit;
selecting subkeys from key material stored in electronic flip-flops for the groups of input data bits, such that one subkey is selected for each group of input data bits; and
applying at least one XOR operation between the subkeys and the groups to generate an output having a second length of output data bits, wherein the first length is independent of the second length, wherein a data expansion function is performed if the first length is less than or equal to the second length, wherein a data compression function is performed if the first length is greater than or equal to the second length, and wherein the at least one XOR operation is implemented by a tree of XOR gates symmetrically arranged in layers such that the XOR gates in each layer are at the same distance from the input with respect to the number of XOR gates leading to them, wherein switching transients of the XOR gates are in the range of a few picoseconds, whereby transients of individual switching events are masked.

2. The method of claim 1 wherein the groups of input data bits are sequential.

3. The method of claim 1 wherein there is no statistical correlation between the first length data and the second length data.

4. The method of claim 1 wherein the subkeys share some bits of the key material.

5. The method of claim 1 wherein the XOR gates within a layer switch at about the same time.

6. The method of claim 1 further comprising the step of applying a nonlinear function to the output, the nonlinear function being selected from the group consisting of an invertible S-Box, a non-invertible S-Box, and series of Rotate-Add-XOR operations.

7. The method of claim 1, wherein the electronic flip-flops are dispersed among other gates.

8. A system for encoding data with low side channel leakage comprising:
an input having a first length of input data bits;
groups of input data bits that are partitioned from the input data bits, each of the groups comprising at least one bit;
subkeys that are selected from key material stored in electronic flip-flops for each of the groups of input data bits such that one subkey corresponds with each group of input data bits;
a tree of XOR gates, wherein the tree of XOR gates is symmetrically arranged in layers such that the XOR gates in each layer are at the same distance from the input with respect to the number of XOR gates leading to them, wherein switching transients of the XOR gates are in the range of a few picoseconds, whereby transients of individual switching events are masked; and
an output having a second length of output data bits, the output being generated by application of at least one XOR operation between the subkeys and the groups, the at least one XOR operation implemented by the tree of XOR gates, wherein the first length is independent of the second length, wherein the system is configured to perform a data expansion function if the first length is less than or equal to the second length, wherein the system is configured to perform a data compression function if the first length is greater than or equal to the second length.

9. The system of claim 8 wherein the groups of input data bits are sequential.

10. The system of claim 8 wherein the subkeys share bits of the key material.

11. The system of claim 8 wherein the XOR gates within a layer switch at about the same time.

12. The system of claim 8, wherein there is no statistical correlation between the first length data and the second length data.

13. The system of claim 8, further comprising a nonlinear function configured to be applied to the output, the nonlinear function being selected from the group consisting of an invertible S-Box, a non-invertible S-Box, and series of Rotate-Add-XOR operations.

14. The system of claim 8, wherein the electronic flip-flops are dispersed among other gates.

15. Non-transitory computer readable media comprising computer readable instructions that, when read by at least one electronic processor, configure the at least one electronic processor to encode data with low side channel leakage by performing operations comprising:
receiving an input having a first length of input data bits;
partitioning the input data bits into groups of input data bits, each group comprising at least one bit;
selecting subkeys from key material stored in electronic flip-flops for the groups of input data bits, such that one subkey is selected for each group of input data bits; and
applying at least one XOR operation between the subkeys and the groups to generate an output having a second length of output data bits, wherein the first length is independent of the second length, wherein a data expansion function is performed if the first length is less than or equal to the second length, wherein a data compression function is performed if the first length is greater than or equal to the second length, and wherein the at least one XOR operation is implemented by a tree of XOR gates symmetrically arranged in layers such that the XOR gates in each layer are at the same distance from the input with respect to the number of XOR gates leading to them, wherein switching transients of the XOR gates are in the range of a few picoseconds, whereby transients of individual switching events are masked.

16. The non-transitory computer readable media of claim 15, wherein the groups of input data bits are sequential.

17. The non-transitory computer readable media of claim 15, wherein there is no statistical correlation between the first length data and the second length data.

18. The non-transitory computer readable media of claim 15, wherein the subkeys share some bits of the key material.

19. The non-transitory computer readable media of claim 15, wherein the XOR gates within a layer switch at about the same time.

20. The non-transitory computer readable media of claim 15, wherein the operations further comprise applying a nonlinear function to the output, the nonlinear function being selected from the group consisting of an invertible S-Box, a non-invertible S-Box, and series of Rotate-Add-XOR operations.

* * * * *